Patented Dec. 6, 1949

2,490,264

UNITED STATES PATENT OFFICE 2,490,264

RUST PREVENTING COMPOSITION

John D. Garber, Cranford, N. J., assignor to Standard Oil Development Company, a corporation of Delaware No Drawing. Application October 13, 1947, Serial No. 779,225

5 Claims. (Cl. 260—33.6)

This invention relates to a rust preventing composition and more particularly to an oil type coating composition which has the properties of adhering to metal and preventing rust in the presence of moisture.

It is well known that mineral oils may be used to some extent for preventing the rusting of steel and various ferrous metal products. It is also known that the efficacy of mineral oil for rust preventing purposes may be greatly improved by incorporating therein various metallo-organic compositions, such as the oil soluble petroleum sulfonates.

Under conditions of high humidity, especially in tropical or semi-tropical climates, considerable difficulty has been encountered in preventing rust, particularly in damp areas or areas near the ocean, and under any conditions where both humidity and temperature are high. Difficulty has also been encountered in securing proper adhesion of the rust preventing composition, or slushing oil, to metal, especially to smooth machined surfaces of steel, iron, and various ferrous metals.

It has now been found that the adhesive properties and the rust inhibiting characteristics of prior art compositions, for example, mineral oil solutions of petroleum sulfonates, may be greatly improved by the incorporation of a relatively small amount of a resinous type polymer obtained from unsaturated hydrocarbons. Various resinous polymers are useful but in particular, the diene-olefin copolymer resins are especially suitable for this purpose. By their use excellent metal adhesion is obtained for slushing oils and the durability and effectiveness of rustproofing treatments are very materially improved.

A specific preferred resinous material for purposes of the present invention is a butadiene and diisobutylene copolymer which is produced by the catalytic copolymerization of these raw materials at a low temperature, for example, −20° C. Although this particular resin appears to have excellent properties and is specifically preferred for this purpose, the invention also contemplates the use of analogous copolymers. However, the diene-olefin copolymers such as those which may be obtained by copolymerizing butadiene, isoprene, dimethyl butadiene, cyclo-pentadiene, divinyl benzene, and the like, with suitable olefins or other unsaturated compounds, such as styrene, isobutylene, propylene, propylene polymers, octadecene, maleic anhydride, methyl acrylate, diethyl fumarate, vinyl acetate, vinyl chloride, and other analogous vinyl compounds are preferred.

In general, the copolymers of a major proportion of butadiene with a minor proportion of diisobutylene are preferred, but as indicated above, other copolymers of dienes and monoolefins and related unsaturated materials are useful. The simple polymers, such as polybutadiene and other polydiene oils or resins made by the sodium or emulsion technique may be used, but are not considered as satisfactory as the specific butadiene diisobutylene polymers described below.

In addition to the resinous or oily type polymers and copolymers described above, other conventional additives may be incorporated in slushing oils if desired, such as viscosity index improvers, antioxidants, pour point depressors, tackiness and anti-tackiness agents, etc. An important feature of the present invention, however, is the use of a polymer or copolymer in such proportions and having such characteristics as to improve the adhesion of the slushing oil composition to the metal surface for which it is intended to provide protection.

In general, it is preferred to employ the resinous or oil type polymers or copolymers, or mixtures thereof, as referred to above, in combination with metallo-organic type rust inhibitors. Suitable compositions of preferred type may comprise from 80 to 98% by weight of mineral oil of appropriate grade. The mineral oil may be preferably of about lubricating grade, although its viscosity may be varied within rather wide limits, for example, from 20 to 300 S. S. U. at 210° F. The oil obviously may contain other materials, such as fatty oils, fatty acids, and the like. To a suitable mineral oil there is added from 0.1 to 10% by weight, based on the total composition, preferably 0.5 to 5% of a suitable metallo-organic rust inhibitor, preferably an oil soluble sulfonate, such as the calcium or sodium sulfonates obtained by treatment of petroleum sulfonic acids with appropriate metal hydroxides. Obviously, the oil soluble sulfonates of various metals, such as the alkalis, and alkaline earth metals, and others may be employed. Sodium sulfonate is usually preferred because of its low cost.

The preferred composition further comprises a quantity of the resinous or oily type polymer or copolymer referred to above to promote adhesion to metals. Such materials will be used in appropriate proportions to secure the desired qualities of tackiness or adhesiveness in the slushing composition. Proportions of the polymer or copolymer may vary from as little as 0.5% to as much as 15% by weight or more, based on the total composition.

The invention may be further illustrated by the following specific examples, it being understood that the various other compositions and ingredients referred to hereinabove may be substituted in various proportions, depending upon the particular use and degree of rustproofing required.

*Example 1*

A solution of 4 parts of an oil soluble petroleum sulfonate of sodium and 6 parts of a resinous copolymer produced by the polymerization of 55 parts of butadiene and 45 parts of diisobutylene at a polymerization temperature of about −20° C. in 90 parts of low viscosity white mineral oil was prepared by heating the agitated mixture at a temperature of 75° C. for several hours. For comparative purposes, a second solution of 4 parts of sodium sulfonate in 96 parts of the same white mineral oil was also prepared.

Separate steel panels were coated respectively with the solutions described above and allowed to drain for 2 hours at ordinary room temperatures. The coated panels were then partially immersed in a covered beaker of water which was maintained at a temperature of 50° C. Thereafter during the test a stream of moist warm air was circulated through the system over the surfaces and the following results were obtained at the time indicated:

| Time in Hours | Oil-Sulfonate-Resin | Oil-Sulfonate |
| --- | --- | --- |
| 24 | Unaffected | Unaffected. |
| 48 | do | Do. |
| 96 | do | Very slight rusting. |
| 200 | do | Considerable rusting. |

*Example 2*

The experiment described above in connection with Example 1 was repeated with the same compositions except that the water in the beaker was maintained at a temperature of 75° C. It will be noted that this test was considerably more severe than that described in the foregoing example.

| Time in Hours | Oil-Sulfonate-Resin | Oil-Sulfonate |
| --- | --- | --- |
| 24 | Unaffected | Slight rusting at interface. |
| 48 | do | Rusting throughout. |
| 96 | Very slight rusting at interface. | Serious rusting throughout. |

While the above examples show the use of particular resins in combination with sodium sulfonates, similar results may be obtained by the use of other rust inhibitors, for example other oil soluble metal sulfonates such as calcium or barium sulfonates, and the like, and with other resinous or oil type polymers or copolymers, as described above. Also, the polymers may be used in oil solution without the metallo-organic compounds although use with the latter is preferred.

In general, the polymers which are useful in the present invention to improve adhesion of the rust preventive to the metal to be protected may be prepared by mixing together a substantial amount, preferably a major proportion of a multiolefin, having 4 to 14 carbon atoms per molecule, and a suitable monoolefin of 3 to 20 carbon atoms, cooling the mixture to a temperature between 0° C. and −103° C. and copolymerizing by introducing a suitable Friedel-Crafts catalyst.

The preferred diolefin is butadiene and the preferred monoolefin is the dimer of isobutylene or the so-called octene. While the precise manner of producing the polymer is not involved in the present invention, a suitable method is as follows:

The monoolefin and multiolefin are mixed in proportions of at least 35% of the multiolefin, e. g. butadiene, preferably at least 50% being used. This mixture is cooled to a temperature below 0° C. and not lower than −103° C. Cooling may be accomplished either by a refrigerating jacket about the reaction vessel, or by direct addition of a suitable refrigerant, such as propane, butane, methyl chloride, or the like. The mixture may also contain an inert diluent such as butane, ethane, pentane, ethyl chloride, or other moderately low-boiling saturated hydrocarbons or substituted hydrocarbons. In some cases the refrigerant may serve also as a diluent.

Polymerization is conducted by the application to the refrigerated mixture of olefin and diolefin (or polyolefin) of a suitable Friedel-Crafts catalyst, preferably in solution in a low-freezing non-complex forming solvent. The catalyst preferred is aluminum chloride and the preferred solvent is ethyl or methyl chloride or carbon disulfide. However other catalysts and solvents may be used, such as aluminum chloro-bromide or aluminum ethoxide, or boron trifluoride in the lighter saturated hydrocarbons such as butane, pentane, hexane, and the like. The resulting polymers have viscosity index improving properties, but their properties of tackiness and of improving the adhesion of oils which contain them to metal surfaces, and of improving generally the rust-proofing properties of compositions of mineral oil containing oil soluble sulfonates, are of particular advantage in the present invention. The polymers preferably have a molecular weight of at least 1,000 to 15,000 or more, those with a molecular weight of 3,000 to 5,000 being especially preferred for use in rust inhibiting compositions. The molecular weight may be controlled by controlling the proportions of the polymerizable ingredients, controlling the temperature, and/or controlling the quantity and rate of addition of the catalyst, as will be understood by those skilled in the art of preparing polymers and copolymers.

I claim:

1. A rust preventing composition consisting essentially of 80 to 98 parts of mineral oil, 0.1 to 10 parts of an oil soluble petroleum metal sulfonate, and 0.5 to 15 parts of a copolymer of butadiene and diisobutylene, having a molecular weight between 3,000 and 5,000.

2. A rust preventing composition consisting essentially of 80 to 98 parts of an oil of petroleum base and lubricating grade, 0.1 to 10 parts of an oil soluble metal petroleum sulfonate, and 0.5 to 15 parts of a copolymer of 55 parts butadiene and 45 parts diisobutylene having a molecular weight between 1,000 and 15,000.

3. A rust preventing composition consisting essentially of 80 to 98 parts by weight of mineral oil, 0.1 to 10 parts of oil soluble metal sulfonate, 0.5 to 15 parts of a copolymer of butadiene and isobutylene of molecular weight between 1,000 and 15,000.

4. A rust preventing composition consisting essentially of 90 parts of mineral oil of lubricating grade, 4 parts of oil soluble petroleum sulfonate, and 6 parts of a resinous copolymer of 55 parts butadiene and 45 parts diisobutylene, said copolymer having a molecular weight between 3,000 and 5,000.

5. Composition as in claim 3 wherein said sulfonate is sodium sulfonate.

JOHN D. GARBER.

REFERENCES CITED

The following references are of record in the file of this patent:

UNITED STATES PATENTS

| Number | Name | Date |
|---|---|---|
| 2,356,127 | Thomas et al. | Aug. 22, 1944 |
| 2,382,699 | Duncan | Aug. 14, 1945 |